Patented Nov. 7, 1939

2,178,983

UNITED STATES PATENT OFFICE 2,178,983

PRODUCTION OF MAGNESIUM HYDROXIDE

Fritz Wienert, Bitterfeld, Germany, assignor, by mesne assignments, to Magnesium Development Corporation, a corporation of Delaware No Drawing. Application December 21, 1934, Serial No. 758,685. Renewed April 1, 1939. In Germany December 23, 1933

16 Claims. (Cl. 23—201)

This invention relates to the production of magnesium hydroxide and more particularly to the production of a readily filterable form of magnesium hydroxide.

According to a known process, magnesium hydroxide or magnesia is obtained by reacting slaked lime or dolomite with magnesium chloride solution, milk of lime or dolomite, stirred up with water, being treated with magnesium chloride liquor at elevated temperature. The resulting magnesium hydroxide is however precipitated in a mucinous difficultly filterable form, from which the calcium chloride mother liquor can be only incompletely separated by washing.

The present invention aims at providing a satisfactory solution of the problem of obtaining, by means of the aforedescribed reaction, a magnesium hydroxide which is readily filterable and therefore of high quality. Exhaustive researches into the phenomena occurring during the reaction have shown that the ease with which filtration of the precipitated magnesium hydroxide may be effected substantially depends on the form in which the calcium hydroxide or slaked dolomite is present in the original suspension or pulp (which latter form is in turn determined by the conditions under which the slaking has been performed) and also that the suspending medium itself has an extensive influence on the form in which the magnesium hydroxide is precipitated.

It has also been ascertained that there is a whole series of substances, the presence of which in the water used for slaking the lime or dolomite causes the hydration of the lime in a form which is particularly suitable for the subsequent reaction with magnesium chloride liquor. Thus the presence of chlorides of the alkali metals or of calcium nitrate, in the water used for slaking the lime or dolomite, has a favourable influence on the filterable capacity of the subsequently formed magnesium hydroxide. Again, the employment of a slaking solution of caustic alkaline character, such as a 10% solution of caustic soda, produces an appreciable improvement in the filterable capacity of the magnesium hydroxide. Even potassium thiocyanate solution exhibits a favourable though slight influence. By far the best results, however, have been obtained with a slaking liquor containing calcium chloride, especially when a small percentage (about 0.2–0.5%) of boric acid or alkali borate is present besides the calcium chloride.

To some extent, the aforementioned substances have also a favourable effect when present in considerable amounts in the medium employed for the suspension of the slaked lime or dolomite, and in which therefore the reaction with the magnesium chloride liquor is carried out. It is true that in this case the effect of the alkali metal chlorides is hardly perceptible; but the presence of nitrates of the alkali metals and alkaline earth metals and also chlorates of the alkali metal in the suspending medium produces a definite improvement in respect to the ease with which filtration of the precipitated magnesium hydroxide is carried out. The best results, however, are again obtained in this case when calcium chloride is present in the milk of lime or dolomite which is to react with the magnesium chloride liquor, in conjunction, if desired, with a small proportion of boric acid or alkali borates in the suspension.

The process is advantageously carried out by slaking and suspending the suitably strongly calcined lime or dolomite directly in a solution containing considerable amounts of the aforesaid salts, producing a favourable effect, and thereupon pouring magnesium chloride liquor into the hot solution, a readily filterable magnesium hydroxide being thus directly obtained.

In order to obtain a magnesium hydroxide that is as pure as possible and, in particular, free from lime, it is advisable to employ, for the reaction, an excess of magnesium chloride, which, however, would be run away to waste with the spent liquor in the case of the hitherto practised method of working.

In accordance with the present invention however, the mother liquor which chiefly contains calcium chloride in addition to this small quantity of magnesium chloride, may be utilised for the slaking and/or the suspension of the lime or dolomite, by which means any magnesium chloride which may be present in the mother liquor is jointly utilised for the reaction.

The lime content of the resulting magnesium hydroxide can be further reduced by removing the coarser particles—which experience has shown are richer in lime—from the suspension by sedimentation, sifting or the like, then crushing them and adding them to the next batch. Alternatively, said particles can be comminuted by mechanical means, such as edge runners, during the reaction itself.

Example I 800 kgs. of strongly calcined lime are slaked with a solution of 20 kgs. of calcium chloride and 2 kgs. of borax in 350 litres of water, then finely ground and entered into 3000 litres of a solution of calcium chloride (sp. gr. 1.35 at 95° C.). After thorough stirring, 4600 litres of magnesium chloride solution (sp. gr. 1.26) are gradually stirred in during a period of 90 minutes, at 95° C. After stirring for another hour at a temperature above 90° C., the crystalline magnesium hydroxide is filtered off and washed.

Example II 800 kgs. of strongly calcined dolomite are finely ground and gradually introduced into 3000 litres of calcium chloride solution (sp. gr. 1.26) at a temperature just above 90° C., precautions being taken to prevent an excessive rise in temperature through the heat of hydration. 2400 litres of magnesium chloride solution (sp. gr. 1.26) with a temperature of about 95° C., are thereupon added in the course of an hour. After stirring for about an hour longer, the precipitate is filtered off and washed.

Example III 1000 kgs. of finely ground, calcined dolomite are gradually introduced, at a temperature above 90° C. into 3800 litres of a liquor obtained by uniting the filtrate and part of the washings from a previous reaction and having a sp. gr. of 1.25. After thorough stirring, 2.5 kgs. of boric acid in about 2500 litres of magnesium chloride solution having a sp. gr. of 1.26 are added in the course of an hour, whereupon 2300 litres of liquid, which is free from magnesium chloride, are filtered off. The resulting filter cakes are united with the remainder of the suspension, and to the latter is added—again by stirring and at 95° C.—the remaining 500 litres of magnesium chloride liquor. After further stirring for an hour at an elevated temperature, the suspension is passed through a cylindrical sieve of 0.2 mm. internal mesh. The drainings are filtered and washed, whilst the coarser particles (about 30 kgs. in weight) are ground in a ball mill and added to the next batch.

I claim:

1. A process for the production of magnesium hydroxide which comprises suspending calcined and slaked lime in a solution, containing a substantial quantity of calcium chloride and between about 0.2–0.5% of boric acid, and reacting such suspension with magnesium chloride liquor at elevated temperatures.

2. A process for the production of magnesium hydroxide which comprises suspending calcined slaked lime in a solution containing a substantial quantity of calcium chloride and between about 0.2 and 0.5 per cent of boric acid, and reacting such suspension with magnesium chloride by gradually adding magnesium chloride liquor thereto at elevated temperatures.

3. A process for the production of magnesium hydroxide which comprises slaking calcined lime with an aqueous solution of calcium chloride, said solution being in quantity sufficient to produce a suspension of said slaked lime, and thereafter reacting such suspension with magnesium chloride liquor at elevated temperatures.

4. A process for the production of magnesium hydroxide which comprises slaking calcined lime with an aqueous solution of calcium chloride, said solution being in quantity sufficient to produce a suspension of said slaked lime, thereafter reacting such suspension with magnesium chloride liquor at elevated temperatures, separating the precipitated magnesium hydroxide from the solution, and slaking a fresh batch of calcined lime with such separated solution.

5. A process for the production of magnesium hydroxide which comprises slaking calcined lime with an aqueous solution of calcium chloride, said solution being in quantity sufficient to produce a suspension of said slaked lime, and thereafter reacting such suspension with magnesium chloride at elevated temperatures by gradually adding magnesium chloride liquor thereto.

6. A process for the production of magnesium hydroxide which comprises suspending a calcined and slaked raw material containing at least a substantial proportion of lime in a solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, and thereafter reacting such suspension with magnesium chloride liquor.

7. A process for the production of magnesium hydroxide which comprises suspending a calcined and slaked raw material containing at least a substantial proportion of lime in a solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, and thereafter reacting such suspension with magnesium chloride liquor at elevated temperatures.

8. A process for the production of magnesium hydroxide which comprises suspending a calcined and slaked raw material containing at least a substantial proportion of lime in a solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, and thereafter reacting such suspension with magnesium chloride liquor at elevated temperatures, separating the precipitated magnesium hydroxide from the solution, and slaking a fresh batch of calcined raw material with such separated solution.

9. A process for the production of magnesium hydroxide which comprises suspending a calcined and slaked raw material containing at least a substantial proportion of lime in a solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, and thereafter reacting such suspension with magnesium chloride at elevated temperatures by gradually adding magnesium chloride liquor thereto.

10. A process for the production of magnesium hydroxide which comprises slaking a calcined raw material containing at least a substantial proportion of lime with an aqueous solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, and thereafter reacting such suspension with magnesium chloride liquor.

11. A process for the production of magnesium hydroxide which comprises slaking a calcined raw material containing at least a substantial proportion of lime with an aqueous solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, thereafter reacting such suspension with magnesium chloride liquor at elevated temperatures, separating the precipitated magnesium hydroxide from the solution, and slaking a fresh batch of calcined raw material with such separated solution.

12. A process for the production of magnesium hydroxide which comprises slaking a calcined raw material containing at least a substantial proportion of lime with an aqueous solution containing at least one substance selected from the group of water-soluble inorganic salts consisting of nitrates of the alkali and alkaline earth metals, alkali metal chlorates and calcium chloride, and further a minor proportion of at least one substance of the group consisting of boric acid and the alkali borates, and thereafter reacting such suspension with magnesium chloride at elevated temperatures by gradually adding magnesium chloride liquor thereto.

13. A process for the production of magnesium hydroxide which comprises suspending a calcined and slaked raw material containing at least a substantial proportion of lime in a solution containing at least one substance selected from the group of water-soluble inorganic salts consisting of nitrates of the alkali and alkaline earth metals, alkali metal chlorates and calcium chloride, and further between about 0.2 and 0.5 per cent of at least one substance of the group consisting of boric acid and the alkali borates, and thereafter reacting such suspension with magnesium chloride liquor.

14. A process for the production of magnesium hydroxide which comprises suspending a calcined and slaked raw material containing at least a substantial proportion of lime in a solution containing at least one substance selected from the group of water-soluble inorganic salts consisting of nitrates of the alkali and alkaline earth metals, alkali metal chlorates and calcium chloride, and further between about 0.2 and 0.5 per cent of at least one substance of the group consisting of boric acid and the alkali borates, and thereafter reacting such suspension with magnesium chloride at elevated temperatures by gradually adding magnesium chloride liquor thereto.

15. A process for the production of magnesium hydroxide which comprises slaking a calcined raw material containing at least a substantial proportion of lime with an aqueous solution containing at least one substance selected from the group of water-soluble inorganic salts consisting of nitrates of the alkali and alkaline earth metals, alkali metal chlorates and calcium chloride, and further between about 0.2 and 0.5 per cent of at least one substance of the group consisting of boric acid and the alkali borates, and thereafter reacting such suspension with magnesium chloride liquor.

16. A process for the production of magnesium hydroxide which comprises slaking a calcined raw material containing at least a substantial proportion of lime with an aqueous solution containing at least one substance selected from the group of water-soluble inorganic salts consisting of nitrates of the alkali and alkaline earth metals, alkali metal chlorates and calcium chloride, and further between about 0.2 and 0.5 per cent of at least one substance of the group consisting of boric acid and the alkali borates, and thereafter reacting such suspension with magnesium chloride at elevated temperatures by gradually adding magnesium chloride liquor thereto.

FRITZ WIENERT.